US 6,677,691 B2

(12) United States Patent
Ebihara

(10) Patent No.: US 6,677,691 B2
(45) Date of Patent: Jan. 13, 2004

(54) STAGE APPARATUS AND METHOD OF USING THE SAME

(75) Inventor: Akimitsu Ebihara, Kyoto (JP)

(73) Assignee: Minolta Co., Ltd., Osaka (JP)

( * ) Notice: Subject to any disclaimer, the term of this patent is extended or adjusted under 35 U.S.C. 154(b) by 30 days.

(21) Appl. No.: 10/107,137

(22) Filed: Mar. 28, 2002

(65) Prior Publication Data

US 2002/0140296 A1 Oct. 3, 2002

(30) Foreign Application Priority Data

Mar. 30, 2001 (JP) ........................................ 2001-101748

(51) Int. Cl.[7] .................. H02K 41/00; G03B 27/42
(52) U.S. Cl. ..................... 310/12; 355/53; 74/471 XY; 74/490.1; 74/479.08; 74/479.09
(58) Field of Search ................................ 310/12; 355/53, 355/72; 74/471 XY, 490.1, 490.08, 490.09; 33/1 M

(56) References Cited

U.S. PATENT DOCUMENTS 5,786,654 A    7/1998  Yoshida et al. ............. 310/328
6,327,929 B1 * 12/2001  Yanagisawa ............. 74/490.09

FOREIGN PATENT DOCUMENTS

JP        11-245128        9/1999

* cited by examiner

Primary Examiner—Nestor Ramirez
Assistant Examiner—Judson H. Jones
(74) Attorney, Agent, or Firm—McDermott, Will & Emery

(57) ABSTRACT

A stage apparatus includes a table disposed above a base table so as to oppose to the base table, an X-axis-direction table support mechanism portion disposed between the base and the table for supporting the table in a state that the table is capable of moving in an X-axis-direction within a two-dimensional plane, a Y-axis-direction table support mechanism portion disposed between the base and the table for supporting the table in a state that the table is capable of moving in a Y-axis-direction within a two-dimensional plane, an X-axis-direction linear guide portion formed on an upper surface of the base and extending in the X-axis-direction, a Y-axis-direction linear guide portion formed on the upper surface of the base and extending in the Y-axis-direction, an X-axis direction movable member provided so as to move along the X-axis-direction linear guide portion and connected to the Y-axis-direction table support mechanism portion, a Y-axis-direction movable member provided so as to move along the Y-axis-direction linear guide portion and connected to the X-axis-direction table support mechanism portion, an X-axis-direction straight drive mechanism fixed to the base for driving the X-axis-direction movable member, and a Y-axis-direction straight drive mechanism fixed to the base for driving the Y-axis-direction movable member. The X-axis-direction linear guide portion and the Y-axis-direction linear guide portion are arranged in a rectangular cross positional relation forming a roughly "+" shape.

8 Claims, 10 Drawing Sheets

STAGE APPARATUS AND METHOD OF USING THE SAME

This application claims priority to Japanese Patent Application No. 2001-101748 filed on Mar. 30, 2001, the disclosure of which is incorporated by reference in its entirety.

BACKGROUND OF THE INVENTION

1. Field of the Invention

The present invention relates to a stage apparatus for performing a predetermined work while positioning a workpiece, etc. in a two-dimensional plane in a machining apparatus or a metering device, and also relates to a method of using the stage apparatus.

2. Description of Related Art

In this kind of apparatus, as shown in FIG. 9, generally, a pair of parallel guide rails 201A and 201B extending in a Y-axis-direction within a two-dimensional plane are provided on a base 200 made of a rigid member such as a metal plate. A lower table 202 slidably supported by the guide rails 201A and 201B is connected to a straight drive apparatus (not shown) fixed to the base 200. Furthermore, on the lower table 202, a pair of parallel guide rails 203A and 203B extending in an X-axis-direction within a two-dimensional plane are provided. An upper table 204 slidably supported by these guide rails 203A and 203B is connected to a straight drive apparatus (not shown) fixed to the lower table 202. Thereby, a workpiece laid on the upper table 204 can be positioned in the X and the Y-axis-directions.

In the aforementioned conventional stage apparatus, two tables 202 and 204 driven individually is disposed one on the other on the base 200. Accordingly, too much load will be applied to the base 200 and/or the lower table 202, and it is hard to equalize the dynamic characteristics of the upper and lower table 204 and 202. Furthermore, since the table load transfer path from the upper table 204 to the base 200 is relatively long, flexure and/or deformation tends to occur in a guide member.

Especially, since each guide rail 201A, 201B, 203A and 203B has assembly accuracy limitations, it is difficult to obtain high-precision straight moving characteristics and/or rectangular guiding characteristics of the upper and lower tables. Therefore, the fluctuation of the lower table 202 causes a slight inclination of the upper table 204 toward a predetermined axial-direction as shown by the dot-dash line. In other words, since the origin of the coordinate system of the upper table 204 is slightly displaced, an error may be easily produced at the time of positioning a workpiece to a predetermined coordinate position because the axis which defines the coordinates of the upper table 204 is displaced in accordance with the movement of the lower table 202, i.e., the so-called Abbe error is produced.

The Abbe error will be explained with reference to FIG. 10.

The lower table 202 moves by a desired distance Y in a Ys-axis-direction while being guided by the guide rails 201A and 201B on the base 200. However, if the guide rails 201A and 201B do not have high-precision linearity, a minute rotation displacement will be generated as shown by the dot-dash line in FIG. 10. On the other hand, the upper table 204 is guided by both the guide rails 203A and 203B fixed to the lower table 202, and moves by only the desired distance X in the Xs-axis-direction. In this case, a minute rotation displacement will be also generated.

Accordingly, when the measuring probe is disposed on the origin 0, the measuring probe originally measures the position (−X, −Y) of the table coordinate system Os-Xs-Ys. However, if the aforementioned minute rotation is generated, the measuring probe measures the position shifted by ΔX, ΔY from the position (−X, −Y). In the case where the axis of the coordinate system for measuring the amount of movement of the upper and lower tables 204 and 202 does not coincide with the position of the measuring probe, it is said "there is an Abbe error."

On the other hand, apart from the aforementioned stage apparatus, for example, the following conventional stage apparatus as shown in FIG. 11 is known. In the apparatus, only one table 301 is supported on a base 300 via a noncontacting bearing (not shown). The table 301 is movable in two axis directions by guide bars 302 and 303 crossing at right angles on the base 300. Furthermore, laser interferometers 306 and 307 are provided at the positions which coincide with absolute-coordinate axes, respectively. Furthermore, bar mirrors 304 and 305 crossing at right angles are disposed on the table 301, while an X-axis-direction linear motor 308a and a Y-axis-direction linear motor 308b are provided on the base 300. The laser interferometer 306 and 307 observe the coordinate system and the measured value is fed back to a laser control system, so that the positioning is performed by the motors 308a and 308b.

However, in this sage apparatus, a pair of driving portions are required for each axis, the X-axis and the Y-axis, and therefore the structure becomes complicated. Furthermore, it is very expensive because of the noncontacting bearing, the laser interferometers 306 and 307, etc. Accordingly, such an apparatus cannot be introduced easily.

SUMMARY OF THE INVENTION

It is an object of the present invention to provide a stage apparatus in which deflection, deformation, etc. of a member is suppressed because of the comparatively simple structure and dynamic characteristics in both axis-directions, X-axis-direction and Y-axis-direction, are equalized.

It is another object of the present invention to provide a stage apparatus which can secure high positioning accuracy without being influenced by the so-called Abbe error.

It is still another object of the present invention to provide a method of using the aforementioned stage apparatus.

According to the first aspect of the present invention, a stage apparatus, comprises:

a table disposed above the base so as to oppose to the base;

an X-axis-direction table support mechanism portion disposed between the base and the table for supporting the table in a state that the table is capable of moving in an X-axis-direction within a two-dimensional plane;

a Y-axis-direction table support mechanism portion disposed between the base and the table for supporting the table in a state that the table is capable of moving in a Y-axis-direction within a two-dimensional plane;

an X-axis-direction linear guide portion formed on an upper surface of the base and extending in the X-axis-direction;

a Y-axis-direction linear guide portion formed on the upper surface of the base and extending in the Y-axis-direction;

an X-axis-direction movable member provided so as to move along the X-axis-direction linear guide portion and connected to the Y-axis-direction table support mechanism portion;

a Y-axis-direction movable member provided so as to move along the Y-axis-direction linear guide portion and connected to the X-axis-direction table support mechanism portion;

an X-axis-direction straight drive mechanism fixed to the base for driving the X-axis-direction movable member; and a Y-axis-direction straight drive mechanism fixed to the base for driving the Y-axis-direction movable member, wherein the X-axis-direction linear guide portion and the Y-axis-direction linear guide portion are arranged in a rectangular cross positional relation forming a roughly "+" shape.

In this stage apparatus, by driving the X-axis-direction movable member with the X-axis-direction straight drive mechanism, this X-axis-direction movable member is displaced in the X-axis-direction along the X-axis-direction linear guide portion on the upper surface of the base. Thereby, the table moves in the X-axis-direction via the Y-axis-direction table support mechanism portion connected to and supported by the movable member. On the other hand, by driving the Y-axis-direction movable member with the Y-axis-direction straight drive mechanism, this Y-axis-direction movable member moves in the Y-axis-direction along the Y-axis-direction linear guide portion. The table moves to the Y-axis-direction via the X-axis-direction table support mechanism portion connected to and supported by the movable member.

In this case, since the table is supported by the movable member at the base side via the table support mechanism portion, the table load transfer path to the base is comparatively short. Thus, deflection or deformation can be suppressed. Furthermore, since one table is driven by each of the X-axis-direction straight drive mechanism and Y-axis-direction straight drive mechanism, the dynamic characteristics of both the drive systems coincide with each other. As a result, a stable movement of the table can be attained. Furthermore, a laser interferometer, etc. becomes unnecessary.

Since the X-axis-direction linear guide portion and the Y-axis-direction linear guide portion on the base are arranged in a rectangular cross relation forming a roughly "+" shape, even if the table slightly rotates in the moving direction due to the scattering of straight-line guide accuracy or rectangular accuracy, the center of rotation will be positioned on the normal line which passes the crossing point of the X-axis-direction linear guide portion and the Y-axis-direction linear guide portion. Accordingly, even if the table moves to a certain position, the central position of the minute rotation remains on the same coordinate position. Accordingly, the so-called Abbe principle will be met, which in turn can minimize the position error of the workpiece due to the minute rotation.

According to the second aspect of the present invention, a method of using a stage apparatus, the method comprises the steps of:

preparing a stage apparatus,
wherein the stage apparatus includes:
    a table disposed above the base so as to oppose to the base;
    an X-axis-direction table support mechanism portion disposed between the base and the table for supporting the table in a state that the table is capable of moving in an X-axis-direction within a two-dimensional plane;
    a Y-axis-direction table support mechanism portion disposed between the base and the table for supporting the table in a state that the table is capable of moving in a Y-axis-direction within a two-dimensional plane;
    an X-axis-direction linear guide portion formed on an upper surface of the base and extending in the X-axis-direction;
    a Y-axis-direction linear guide portion formed on the upper surface of the base and extending in the Y-axis-direction;
    an X-axis-direction movable member provided so as to move along the X-axis-direction linear guide portion and connected to the Y-axis-direction table support mechanism portion;
    a Y-axis-direction movable member provided so as to move along the Y-axis-direction linear guide portion and connected to the X-axis-direction table support mechanism portion;
    an X-axis-direction straight drive mechanism fixed to the base for driving the X-axis-direction movable member; and
    a Y-axis-direction straight drive mechanism fixed to the base for driving the Y-axis-direction movable member,
    wherein the X-axis-direction linear guide portion and the Y-axis-direction linear guide portion are arranged in a rectangular cross positional relation forming a roughly "+" shape; and
performing a predetermined work to the workpiece by setting the acting point on the workpiece so that a normal line from an acting point of the workpiece toward the upper surface of the base passes an intersection of the X-axis-direction linear guide portion and the Y-axis-direction linear guide portion on the upper surface of the base.

In this method of application, a predetermined measurement or processing can be performed correctly with no Abbe error even if minute rotation of the table occurs.

Other objects and the features will be apparent from the following detailed description of the present invention with reference to the attached drawings.

BRIEF DESCRIPTION OF THE DRAWINGS

The present invention will be more fully described and better understood from the following description, taken with the appended drawings, in which.

DETAILED DESCRIPTION OF THE PREFERRED EMBODIMENTS

Figure 1:
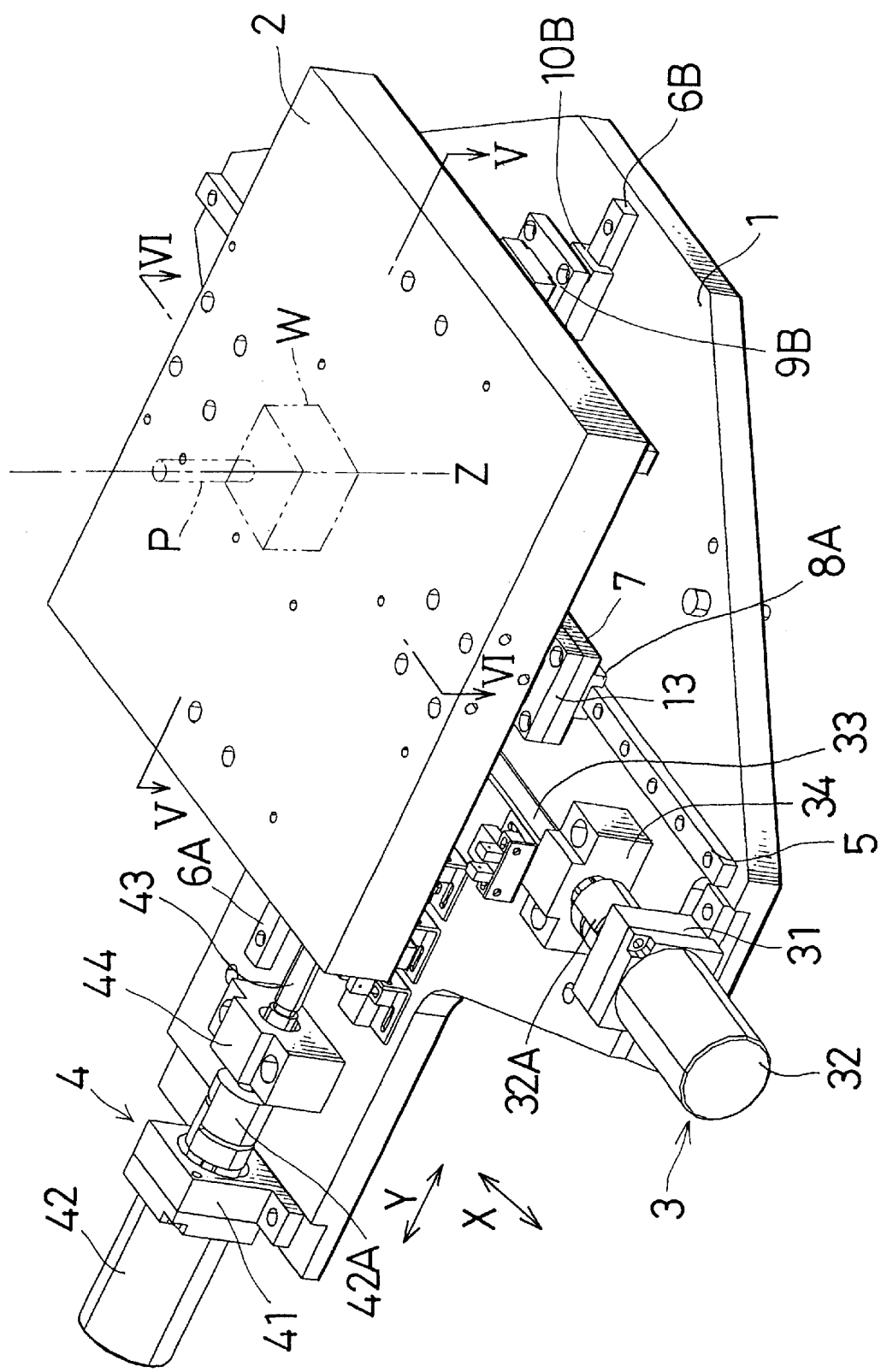
FIG. 1 is a perspective view showing a stage apparatus according to the first embodiment of the present invention.
Figure 2:
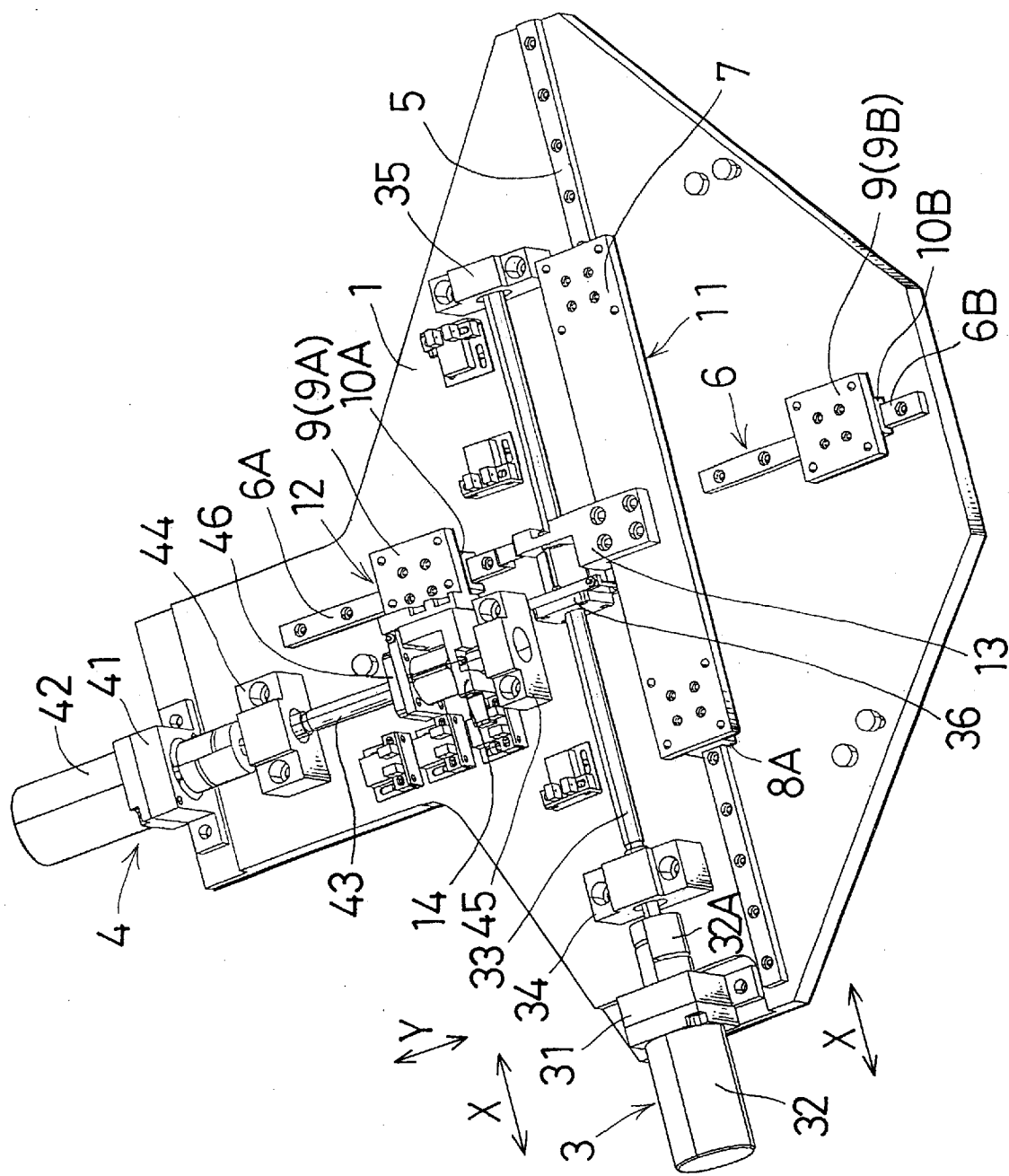
FIG. 2 is a perspective view showing the stage apparatus in the state that the table is removed.

FIG. 1 is a perspective view showing an stage apparatus according to the first embodiment of the present invention, and FIG. 2 is a perspective view showing the stage apparatus from which a part thereof is removed.

In the drawing to which the following explanation refers, the cross-hatching portion shows the fixed side of each part fixed to the upper surface of the base 1.

In FIGS. 1 and 2, the reference numeral 1 denotes a base which consists of a plate-shaped rigid member such as a surface plate. Above this table 1, a rectangular plate-shaped table 2 for positioning of a workpiece W is disposed so that the table can move in two axes directions (X-axis-direction and Y-axis-direction). In the following explanation, as a workpiece W, for example, a workpiece to which a measuring probe P is contacted in order to measure the external surface of the workpiece or a workpiece to which an edge of a cutting tool is contacted in order to machine the external surface of the workpiece are exemplified. However, the workpiece W is not limited to the above.

On the upper surface of the base 1, a straight drive mechanism 3 corresponding to an X-axis-direction and a straight drive mechanism 4 corresponding to a Y-axis-direction are disposed.

One of the straight drive mechanisms 3 is provided with a motor 32 fixed to the base 1 via a fixing member 31, a feed screw 33 arranged along the X-axis-direction, bearing members 34 and 35 for supporting both ends of the feed screw 33 and a movable-member-feeding nut 36 engaged with the feed screw 33. The rotation force of the motor 32 is transmitted to the feed screw 33, and therefore the feed screw 33 is rotated, so that the relative movement of the nut 36 in the X-axis-direction can be performed.

The other straight drive mechanism 4 is provided with a motor 42 fixed to the base 1 via a fixing member 41, a feed screw 43 arranged along the Y-axis-direction, bearing members 44 and 45 for supporting both ends of the feed screw 43 and a movable-member-feeding nut 46 engaged with the feed screw 43. The rotation force of the motor 42 is transmitted to the feed screw 43, and therefore the feed screw 43 is rotated, so that the relative movement of the nut 46 in the Y-axis-direction can be performed.

Rotary encoders 32A and 42A are attached to the motors 32 and 42, respectively. In order to shift the table by a predetermined amount, it is constituted that the motors 32 and 42 can finely control the rotational angle of the feed screw 33 and 43 by a controller (not shown).

Although various kinds of feed mechanisms utilizing a rack, a pinion, etc., can be employed as the straight drive mechanisms 3 and 4, using the motors 32 and 42 and the feed screws 33 and 43 as in this example enables a fine control of the table movement.

The reference numeral 5 denotes a guide rail as one linear guide portion extending in the X-axis-direction. The guide rail 5 is located at the approximate center portion of the upper surface of the base 1, and is fixed near the feed screw 33. The reference numeral 6 denotes a guide rail as one linear guide portion extending in the Y-axis-direction. The guide rail 6 consists of two rail piece portions 6A and 6B separated in the Y-axis-direction. These rail piece portions 6A and 6B are arranged near the feed screw 43 and fixed on the base 1 in a state that these rail piece portions and the guide rail 5 are arranged in a rectangular cross positional relation forming a "+" shape or nearly "+" shape.

Figure 3:
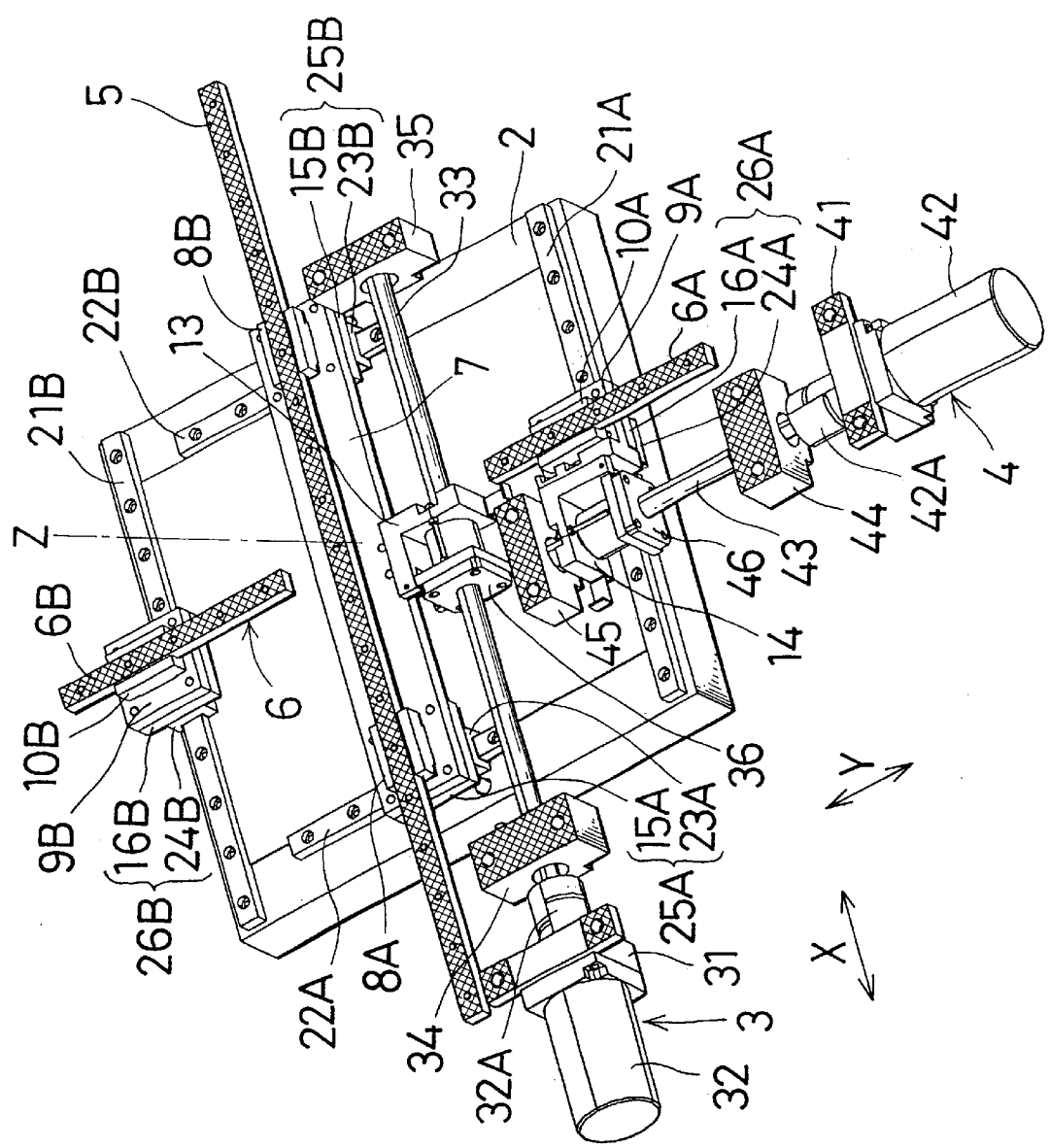
FIG. 3 is a perspective view the stage apparatus from which the base is removed in a turned over state.

As shown in FIG. 3, a pair of ⊐-shaped sliders 8A and 8B as the movable members fixed to both ends of the long plate-shaped joint member 7 extending in the X-axis-direction are slidably engaged with the aforementioned guide rail 5, and constitutes an X-axis-direction table straight movement guide mechanism 11 together with the guide rail 5.

Furthermore, as shown in FIG. 3, two movable members such as ⊐-shaped sliders 10A and 10B, to which plate-shaped joint members 9A and 9B are fixed, respectively, are slidably engaged with the guide rail 6, i.e., rail piece portions 6A and 6B, respectively, and constitute a Y-axis-direction table straight moving guide mechanism 12 with the guide rail 6.

Although a guide groove formed in the base 1 may be employed in replace of the aforementioned guide rails 5 and 6, using the guide rails 5 and 6 is more economical in consideration of the processing labor.

Furthermore, although a member using rollers may be employed in place of the aforementioned movable member, the sliders 8A, 8B, 10A and 10B in the embodiment enables a smooth guide operation.

The nut 36 is connected to the joint member 7 via the connection unit 13. The nut 36 moves in an X-axis-direction in accordance with the rotation of the feed screw 33 by the motor 32, which in turn moves the joint member 7 connected to the nut 36 in the X-axis-direction. On the other hand, the other nut 46 is connected to the joint member 9A via a connection unit 14. The nut 46 moves in a Y-axis-direction in accordance with the rotation of the feed screw 43 by the motor 42, which in turn moves the joint member 9A connected to the nut 46 in the Y-axis-direction.

The connection units 13 and 14 are equipped with an elastic mechanism (not shown), respectively, so that the smooth straight moving characteristics of the sliders 8A and 8B and the sliders 9A and 9B are secured by absorbing the parallelism errors between the guide rail 5 and the feed screw 33.

Figure 5:
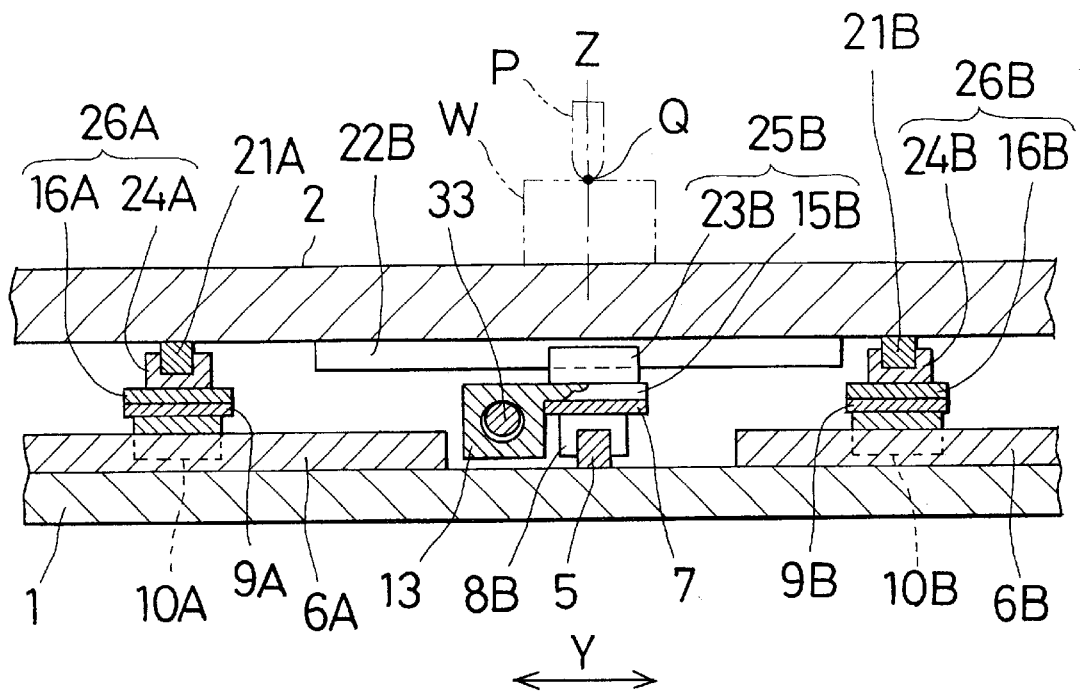
FIG. 5 is a cross-sectional view taken along the line V—V in FIG. 1.
Figure 6:
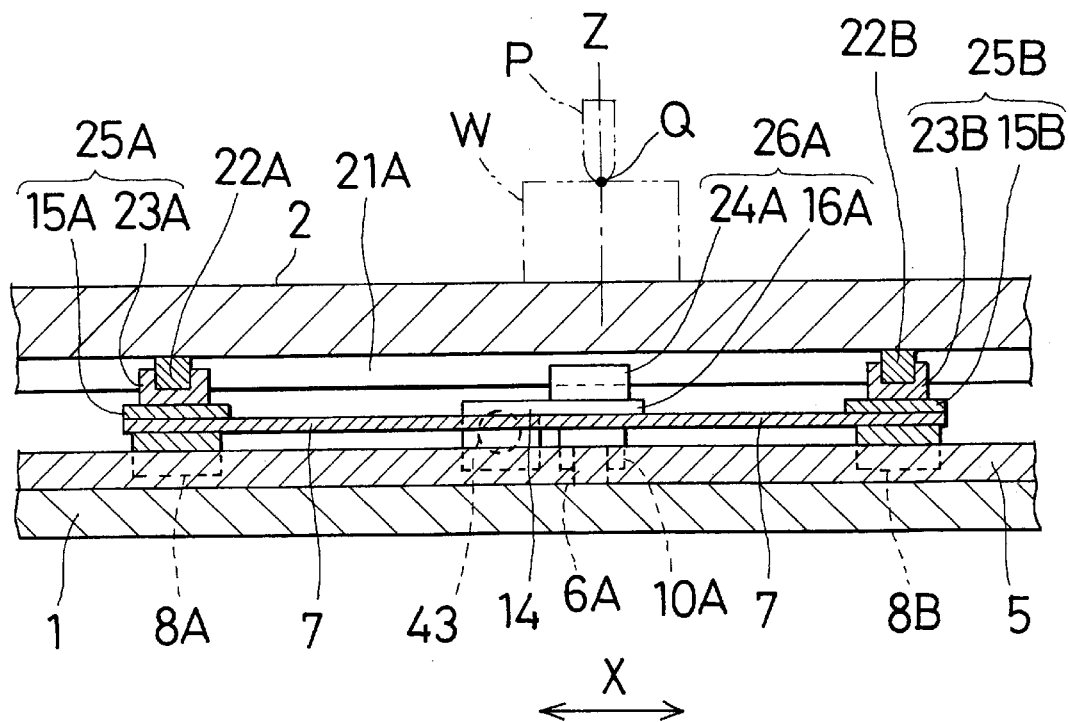
FIG. 6 is a cross-sectional view taken along the line VI—VI in FIG. 1.

As shown in FIG. 6, plate-shaped intermediate joint members 15A and 15B are fixed to both ends of the upper surface of the joint member 7, respectively. Furthermore, as shown in FIG. 5, plate-shaped intermediate joint members 16A and 16B are fixed to each upper surface of the joint members 9A and 9B.

Figure 4:
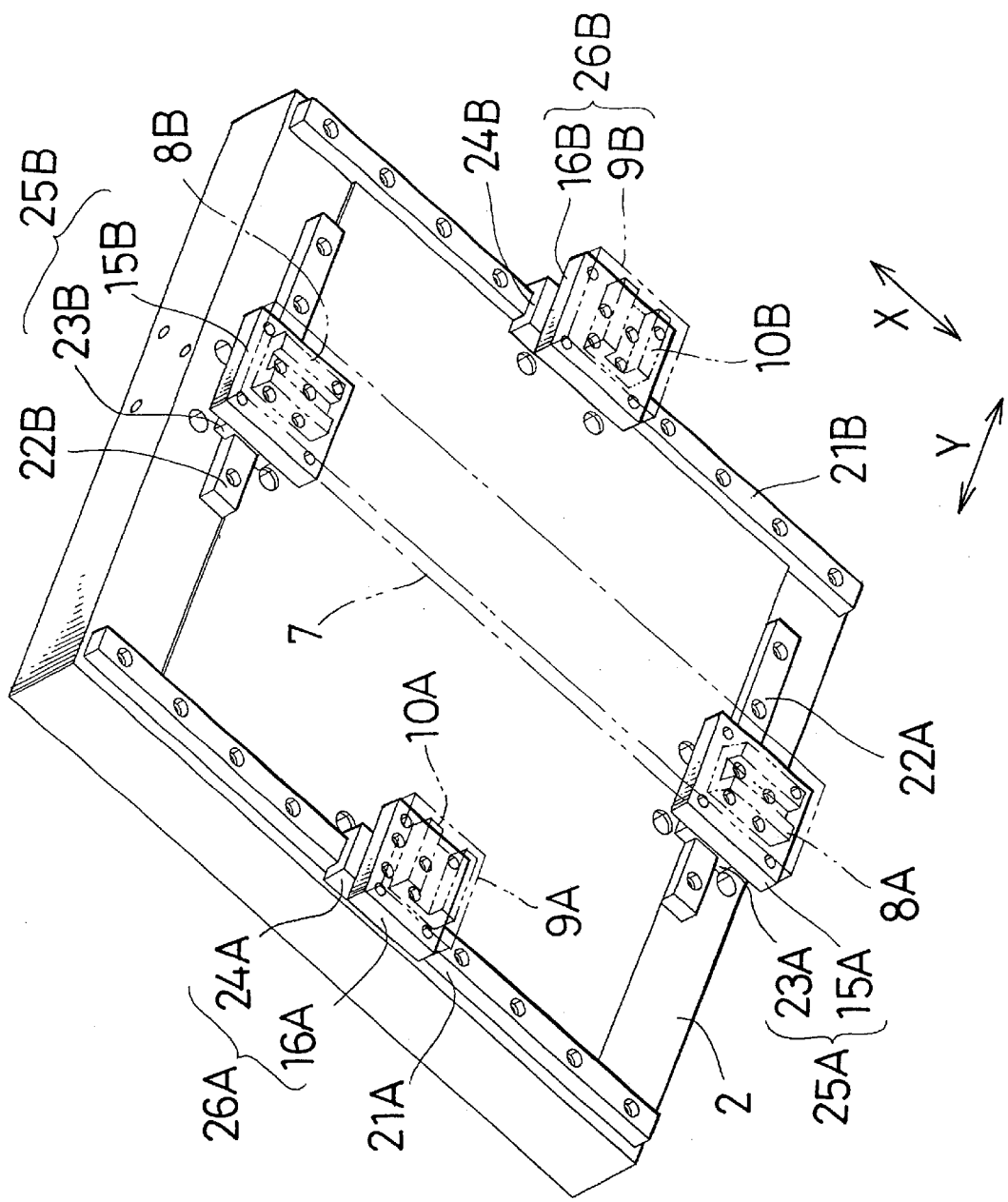
FIG. 4 is a perspective view of the table and the slide mechanism of the stage apparatus as seen from the bottom side.

As shown in FIG. 4, at both side portions of the lower surface of the table 2 along the X-axis-direction, guide rails 21A and 21B as linear guide portions extending along the X-axis-direction are fixed, respectively. Furthermore, at both side portions of the lower surface of the table 2 along the Y-axis-direction, guide rails 22A and 22B as linear guide portions extending along the Y-axis-direction are fixed, respectively. In place of the aforementioned guide rails 21A and 21B, and 22A and 22B, guide grooves formed in the lower surface of the table 2 may be employed.

As shown in FIGS. 4 and 6, on the upper surface of each of the aforementioned intermediate joint members 15A and 15B, upper sliders 23A and 23B, as upper movable members for supporting guide rails 22A and 22B extending along the Y-axis-direction are fixed, respectively. Furthermore, as shown in FIGS. 4 and 5, on each of the upper surface of the aforementioned intermediate joint members 16A and 16B, upper sliders 24A and 24B as upper movable members for supporting guide rails 21A and 21B extending along the X-axis-direction possible are fixed, respectively.

The aforementioned intermediate joint members 15A and 15B and upper sliders 23A and 23B constitute table support mechanism portions 25A and 25B extending the Y-axis-direction for supporting the table 2 in the Y-axis-direction. Furthermore, the aforementioned intermediate joint members 16A and 16B and upper sliders 24A and 24B constitute table support mechanism portions 26A and 26B extending the X-axis-direction for supporting the table 2 in the X-axis-direction. Needless to say, the structure of both the tables support mechanism portions 25 and 26 is not limited to the above, any sliding mechanisms, etc. can be employed.

Next, the operation of the stage apparatus according to the illustrated embodiment will be explained.

When the motor 32 rotates the feed screw 33 in a state that a workpieace W is placed on the table 2, the nut 36 moves in the X-axis-direction. As a result, the joint member 7 moves in the X-axis-direction along the guide rail 5 via the sliders 8A and 8B. Since the upper sliders 23A and 23B engaged with the guide rails 22A and 22B fixed to the lower surface of the table 2 and extending in the Y-axis-direction are connected to the joint member 7, respectively, the movement of the joint member 7 is transmitted to the table 2. As a result, this table 2 moves in the X-axis-direction via the upper sliders 24A and 24B guided by the guide rails 21A and 21B fixed to the lower surface of the table 2 and extending the X-axis-direction.

On the other hand, when the motor 42 rotates the feed screw 43, the joint members 9A and 9B moves in the Y-axis-direction along the guide rails 6 (6A and 6B) in accordance with the movement of the nut 46 in the Y-axis-direction via the sliders 10A and 10B, respectively. Since the upper sliders 24A and 24B engaged with the guide rails 21A and 21B fixed to the lower surface of the table 2 and extending in the X-axis-direction are connected to the joint members 9A and 9B, respectively, the movement of the joint members 9A and 9B is transmitted to the table 2. As a result, this table 2 moves in the Y-axis-direction via the upper sliders 23A and 23B guided by the guide rails 22A and 22B fixed to the lower surface of the table 2 and extending the Y-axis-direction. Thereby, it becomes possible to move the table 2 in both the X-axis-direction and the Y-axis-direction.

As mentioned above, the table 2 is supported by the Y-axis-direction table support mechanism portions 25A and 25B connected to the sliders 8A and 8B extending in the X-axis-direction and the X-axis-direction table support mechanism portions 26A and 26B connected to the sliders 10A and 10B extending in the Y-axis-direction. Accordingly, the structure is simpler than that of the so-called two-story table structure, and it is possible to manufacture more cheaply as compared with the system employing the combination of the linear motor and the laser interferometer, etc. Furthermore, since the load of the table 2 is directly transferred to the base 1 via the Y-axis-direction table support mechanism portions 25A and 25B and the X-axis-direction table support mechanism portions 26A and 26B from the sliders 8A, 8B, 10A and 10B located right under the mechanism portions, the load transfer path to the base 1 becomes short. Thereby, the deflection or deformation of the member or the like can be suppressed.

Furthermore, since the motors 32 and 42 are arranged on the upper surface of the base 1, i.e., on the same plane, the wiring or the like can be simplified. In addition, when the table 2 is displaced in the X-axis-direction or the Y-axis-direction, the load applied to the motor 32 and the feed screw 33 as well as the motor 42 and the feed screw 43 is equal. Thus, the dynamic characteristics in the X-axis-direction and the Y-axis-direction become the same, which enables the smooth movement of the table 2. Accordingly, uniform control characteristics can be obtained without adjusting the rotation force of the motors 32 and 42.

Furthermore, since the feed screws 33 and 34 are arranged near the guide rails 5 and 6, respectively, the shift amount of the X-axis-direction of the workpiece W at the time of moving the table 2 in the X-axis-direction approximately coincides with that of the nut 36. On the other hand, since the feed screw 43 is arranged near the guide rail 6, the shift amount of the Y-axis-direction of the workpiece W at the time of moving the table 2 in the Y-axis-direction approximately coincides with that of the nut 46. Accordingly, the following movement of the table 2 can be enhanced.

Now, when the apparatus is driven in a state in which the table center of gravity is separated from the feed screws 33 and 43 in cases where the guide rigidity is low, the minute rotation of the table 2 called yawing occurs. In other words, the table 2 is minutely displaced such that the joint member 7 connected to the nut 36 to be moved in the X-axis is displaced minutely in the opposite direction along the guide rails 22A and 22B extending in the Y-axis-direction and that the joint members 9A and 9B connected to the nut 46 to be moved in the Y-axis perform are displaced minutely in the opposite direction along with the guide rails 21A and 21B extending in the X-axis-direction.

Figure 7:
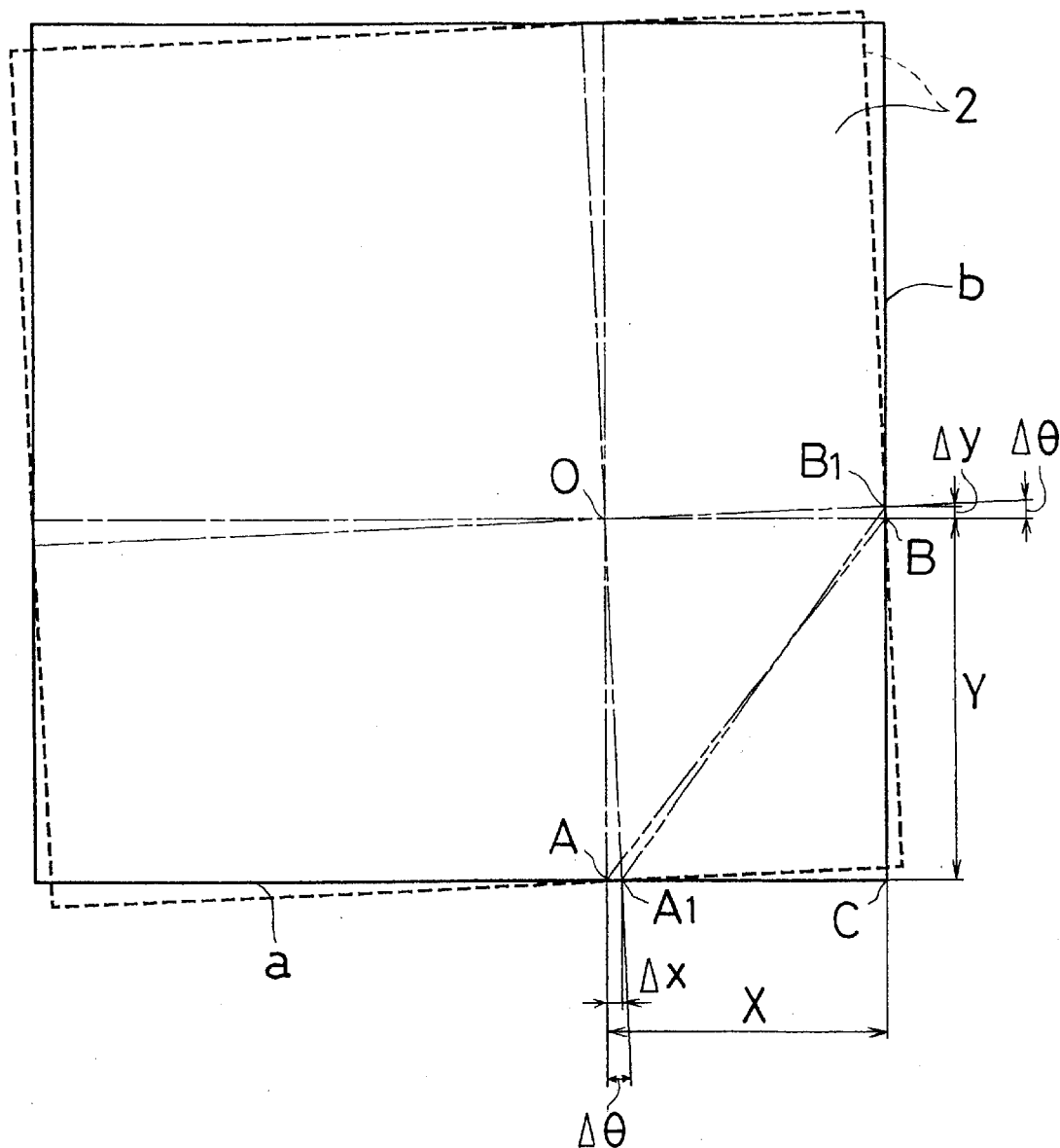
FIG. 7 is explanatory drawing of minute rotation of the table.

As shown in FIG. 7, for example, it is assumed that the slider A to be moved along the side a of the table 2 along the X-axis-direction is minutely displaced by $\Delta x$ in the X-axis-direction to the position $A_1$, and the slider B to be moved along the side b of the table 2 along the Y-axis-direction is displaced by $\Delta y$ to the position $B_1$, and thereby the table 2 is minutely rotated from the state shown by the solid line to the state shown by the broken line.

The following equation can be obtained.

$$|AC|^2 + |BC|^2 = |AB|^2$$

where the side AC=x, $AA_1 = \Delta x$, BC=y, $BB_1 = \Delta y$, OC=AB=$A_1 B_1$=R.

That is, $$X^2 + Y^2 = R^2 \qquad (1)$$

At the time of the minute displacement of the table 2, $$|A_1 C|^2 + |B_1 C|^2 = |A_1 B_1|^2$$

That is, $$(X - \Delta x)^2 + (y + \Delta y)^2 = R^2 \qquad (2)$$

By developing the aforementioned equation (2) and substituting the aforementioned equation (1), and ignoring $(\Delta x)^2$, $(\Delta y)^2$, the following equation can be obtained:

$$\Delta x / y = \Delta y / x = \Delta \theta \qquad (3)$$

From the above equation (3), $$\angle AOA_1 = \angle BOB_1 = \angle \theta$$

As will be apparent from the above, the center of minute rotation when yawing of the table 2 occurs becomes the O point. In other words, in the perpendicularly crossing sides a and b of the table 2, the intersection of the line perpendicular to the slide direction of the slider A and the line perpendicular to the slide direction of the slider B is the center of the aforementioned minute rotation.

In the aforementioned embodiment, each guide rail 21A and 21B of the table 2 extending in the X-axis-direction which guide the upper sliders 24A and 24B and the guide rails 6 (6A and 6B) of the base 1 extending in the Y-axis-direction cross at right angles, and each guide rail 22A and 22B of the table 2 extending in the Y-axis-direction which guide the upper sliders 23A and 23B and the guide rail 5 of the base 1 extending in the X-axis-direction cross at right angles. Accordingly, the center O of the minute rotation will be located on the intersection of the guide rail 5 and the guide rail 6. Accordingly, even if the table 2 moves to the arbitrary position in the X-axis-direction or Y-axis-direction, the center O of the minute rotation always stays at the same position.

When the acting point Q is set such that the normal line Z from the acting point Q (the tip of the measuring probe P, the edged of the cutting tool) of the tool to the base 1 (FIG. 5, FIG. 6) passes the intersection of the guide rail 5 and the guide rail 6, the acting point Q always exists on the center O of the minute rotation, the so-called "Abbe principle" will be met in a plane. Therefore, the error due to the minute rotation will not be produced.

In other words, each displaced amount in the X-axis-direction and the Y-axis-direction from the center O of the minute rotation which is the workpiece detecting point of the probe P coincides with the displaced amount of the nuts 36 and 46. This displaced amount is approximately the same as the displaced amount on the absolute-coordinate axes. Therefore, it is not necessary to correct the position accuracy due to the minute rotation, and exact positioning accuracy can be obtained.

Also in this embodiment, the probe P is fixed to the base 1 or another suitable portion where the normal line Z from the acting point Q to the workpiece to the base 1 passes the intersection of the guide rail 5 and the guide rail 6.

Figure 8:
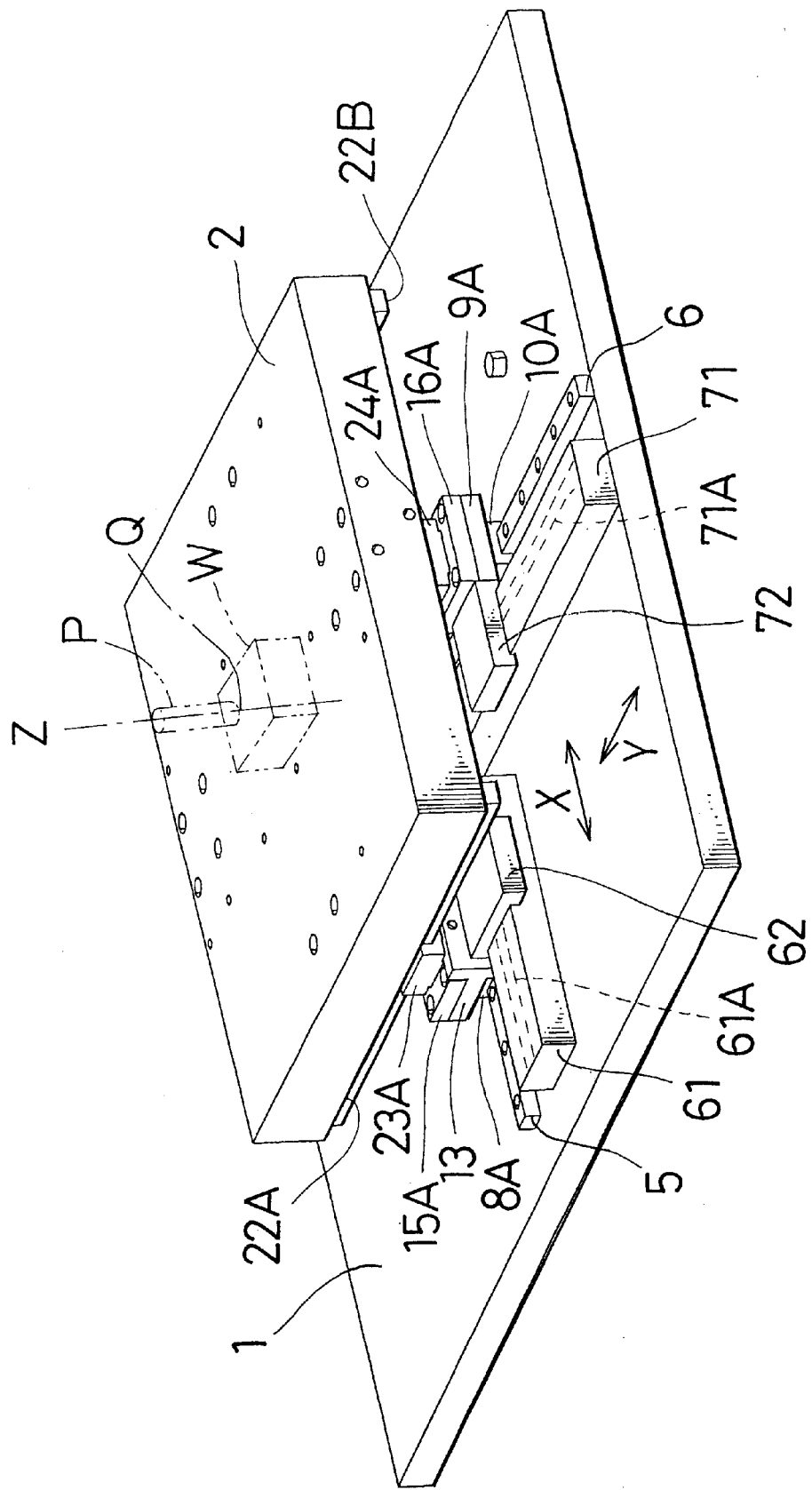
FIG. 8 is a perspective view showing a stage apparatus according to another embodiment of the present invention.
Figure 9:
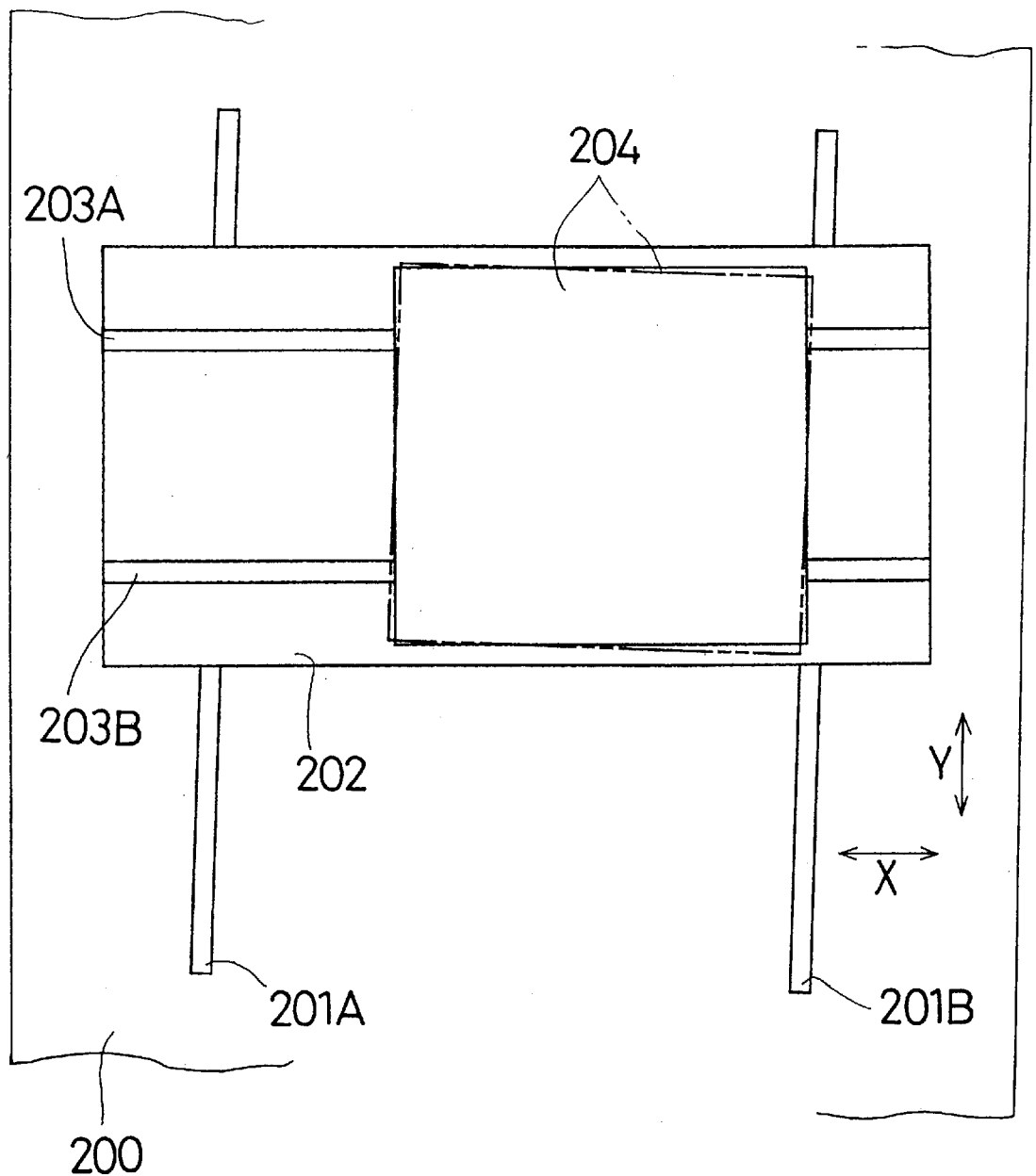
FIG. 9 is an explanatory drawing showing a conventional stage apparatus.
Figure 10:
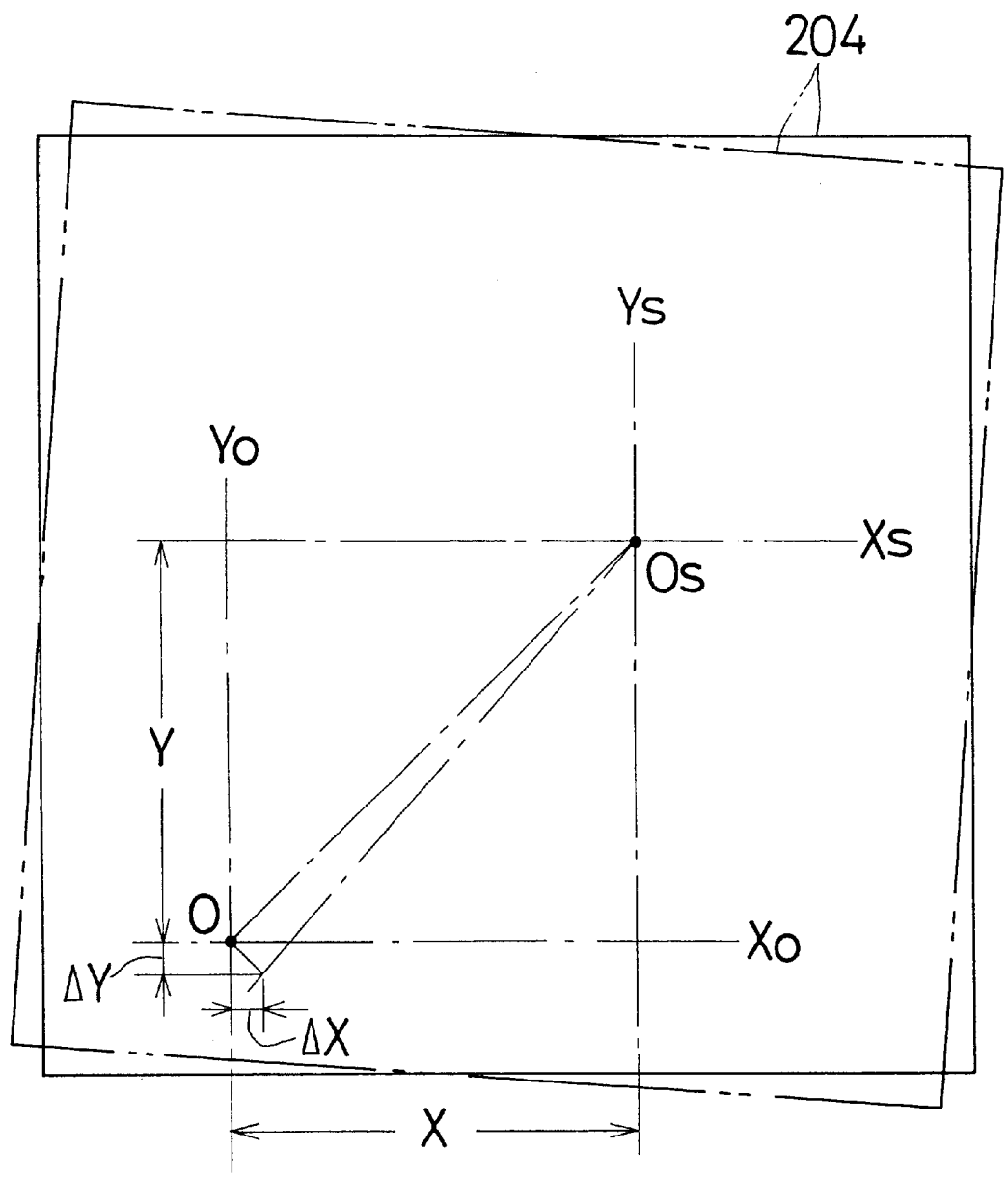
FIG. 10 is an explanatory drawing of the so-called Abbe error.
Figure 11:
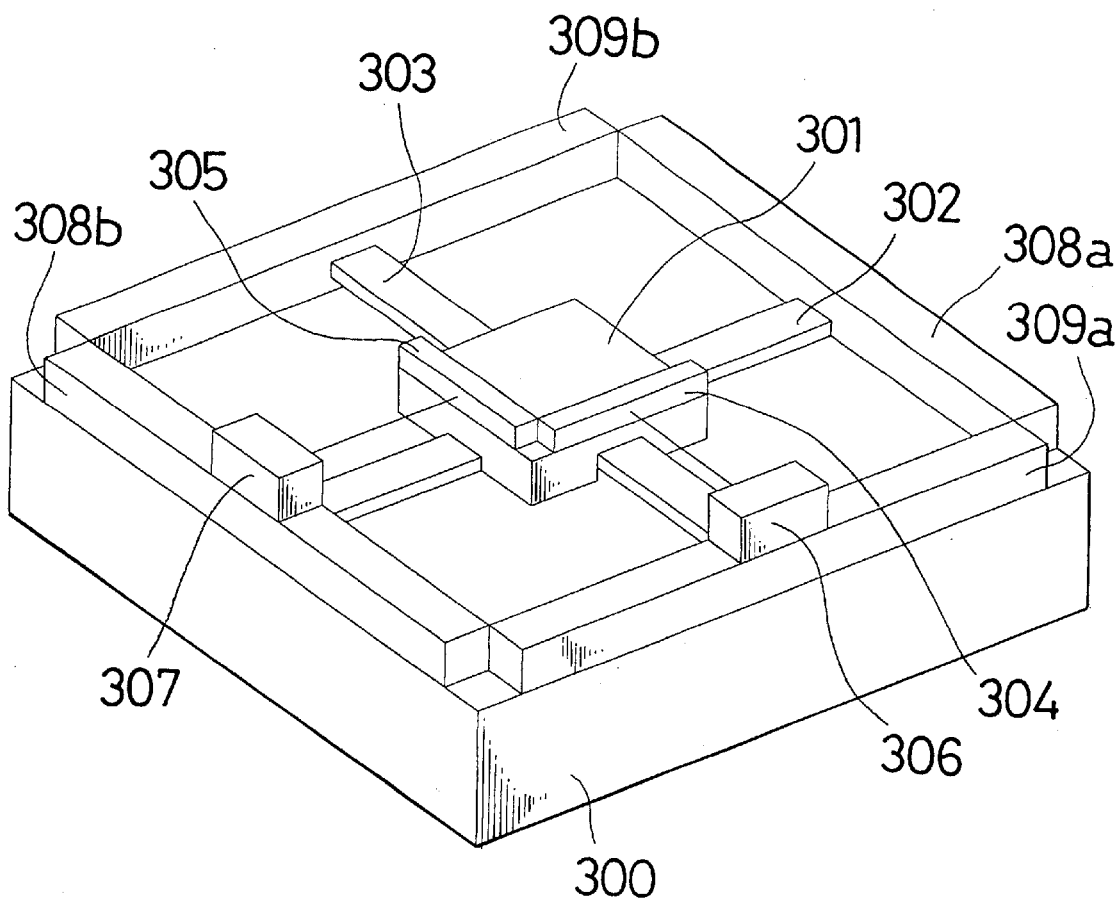
FIG. 11 is an explanatory drawing of another conventional stage apparatus.

FIG. 8 is a perspective view showing a stage apparatus according to another embodiment of the present invention. In FIG. 8, the same reference numeral is given to the same as that of FIGS. 1 to 4, and therefore the explanation will be omitted.

In FIG. 8, on the base 1, a linear motor 61 and a linear encoder 61A are arranged in parallel with the guide rail 5 as a straight drive mechanism in an X-axis-direction, and a linear motor 71 and a linear encoder 71A are arranged in parallel with the guide rail 6 as a straight drive mechanism in a Y-axis-direction. The driving member 62 for an X-axis-direction linear motor 61 is connected to the upper slider 23A and 23B side via the connection unit 13, joint-member 15A, etc. in place of the aforementioned nut 36, and the driving member 72 for a Y-axis-direction linear motor 71 is connected to the upper slider 24A and 24B side via the connection unit 14, joint member 9A, etc. in place of the aforementioned nut 46.

Also in this case, the same effect as in the embodiment can be obtained. Furthermore, since the apparatus can be driven while minutely measuring the moving amount of the table 2 by the linear encoders 61A and 71A, etc., more exact positioning can be performed.

The terms and descriptions in this specification are used only for explanatory purposes and the present invention is not limited to these terms and descriptions. It should be appreciated that there are many modifications and substitutions without departing from the spirit and the scope of the present invention which is defined by the appended claims. The present invention permits any design-change, unless it deviates from the soul, if it is within the limits by which the claim was performed.

What is claimed is:

1. A stage apparatus, comprising:
    a table disposed above said base so as to oppose to said base;
    an X-axis-direction table support mechanism portion disposed between said base and said table for supporting said table in a state that said table is capable of moving in an X-axis-direction within a two-dimensional plane;
    a Y-axis-direction table support mechanism portion disposed between said base and said table for supporting said table in a state that said table is capable of moving in a Y-axis-direction within a two-dimensional plane;
    an X-axis-direction linear guide portion formed on an upper surface of said base and extending in said X-axis-direction;
    a Y-axis-direction linear guide portion formed on said upper surface of said base and extending in said Y-axis-direction;
    an X-axis-direction movable member provided so as to move along said X-axis-direction linear guide portion and connected to said Y-axis-direction table support mechanism portion;
    a Y-axis-direction movable member provided so as to move along said Y-axis-direction linear guide portion and connected to said X-axis-direction table support mechanism portion;
    an X-axis-direction straight drive mechanism fixed to said base for driving said X-axis-direction movable member; and
    a Y-axis-direction straight drive mechanism fixed to said base for driving said Y-axis-direction movable member,
    wherein said X-axis-direction linear guide portion and said Y-axis-direction linear guide portion are arranged in a rectangular cross positional relation forming a roughly "+" shape.

2. The stage apparatus as recited in claim 1, wherein said X-axis-direction straight drive mechanism and said Y-axis-direction straight drive mechanism are arranged near said X-axis-direction linear guide portion and said Y-axis-direction linear guide portion, respectively.

3. The stage apparatus as recited in claim 1, wherein said straight drive mechanism includes a motor and a feed screw mechanism having a feed screw which rotates by receiving rotation force of said motor and a nut engaged with said feed screw for driving said movable member.

4. The stage apparatus as recited in claim 3, wherein a rotary encoder for detecting an amount of displacement of said movable member is connected to said motor.

5. The stage apparatus as recited in claim 1, wherein said straight drive mechanism is constituted by a linear motor for driving said movable member.

6. The stage apparatus as recited in claim 5, wherein a linear encoder for detecting an amount of displacement of said movable member is attached to said linear motor.

7. The stage apparatus as recited in claim 1, further comprising a tool which acts on a workpiece, wherein said tool is arranged so that a normal line from an acting point of said workpiece toward said upper surface of said base passes an intersection of said X-axis-direction linear guide portion and said Y-axis-direction linear guide portion on said upper surface of said base.

8. A method of using a stage apparatus, the method comprising the steps of:
    preparing a stage apparatus,
    wherein said stage apparatus includes:

a table disposed above said base so as to oppose to said base;

an X-axis-direction table support mechanism portion disposed between said base and said table for supporting said table in a state that said table is capable of moving in an X-axis-direction within a two-dimensional plane;

a Y-axis-direction table support mechanism portion disposed between said base and said table for supporting said table in a state that said table is capable of moving in a Y-axis-direction within a two-dimensional plane;

an X-axis-direction linear guide portion formed on an upper surface of said base and extending in said X-axis-direction;

a Y-axis-direction linear guide portion formed on said upper surface of said base and extending in said Y-axis-direction;

an X-axis-direction movable member provided so as to move along said X-axis-direction linear guide portion and connected to said Y-axis-direction table support mechanism portion;

a Y-axis-direction movable member provided so as to move along said Y-axis-direction linear guide portion and connected to said X-axis-direction table support mechanism portion;

an X-axis-direction straight drive mechanism fixed to said base for driving said X-axis-direction movable member; and a Y-axis-direction straight drive mechanism fixed to said base for driving said Y-axis-direction movable member, wherein said X-axis-direction linear guide portion and said Y-axis-direction linear guide portion are arranged in a rectangular cross positional relation forming a roughly "+" shape; and performing a predetermined work to said workpiece by setting said acting point on said workpiece so that a normal line from an acting point of said workpiece toward said upper surface of said base passes an intersection of said X-axis-direction linear guide portion and said Y-axis-direction linear guide portion on said upper surface of said base.

* * * * *